United States Patent Office 3,663,642
Patented May 16, 1972

3,663,642
SYNTHESIS OF ISOPRENE
Rudolph Rosenthal, Broomall, Giovanni A. Bonetti, Wynnewood, and Harold Shalit, Drexel Hill, Pa., assignors to Atlantic Richfield Company, New York, N.Y.
No Drawing. Filed Dec. 16, 1970, Ser. No. 98,894
Int. Cl. C07c 1/20
U.S. Cl. 260—681    3 Claims

ABSTRACT OF THE DISCLOSURE

Improvement in the method for the synthesis of isoprene by condensation of isobutylene and formaldehyde over an acidic catalyst in the vapor phase, such improvement being increasing the reaction temperature during the duration of the run to compensate for the decrease in activity of the catalyst, thus increasing the length of time between catalyst regenerations without loss in isoprene production rate.

BACKGROUND OF THE INVENTION

Field of the invention

This invention relates to a method for the synthesis of isoprene by the vapor phase condensation of isobutylene with formaldehyde over a boron phosphate on silica gel catalyst wherein the reaction temperature is gradually increased to compensate for the decrease in catalyst activity during the run thus permitting longer times between catalyst regenerations without loss in isoprene production rate.

Prior art

United States Pat. No. 2,997,509 (1961), describes a process for the synthesis of isoprene by reaction of isobutylene with formaldehyde over a boron phosphate on silica gel catalyst. Example 7 of the patent shows decreases in the isoprene formation rates over a 10 hour period to about 55–70 percent of that originally found. Accordingly, in order to maintain high production rates it is necessary to regenerate the catalyst frequently which renders the process commercially unattractive.

The present invention obviates this problem by providing a method for conducting the process for longer times without loss in isoprene production rate.

SUMMARY OF THE INVENTION

In accordance with this invention the synthesis of isoprene by condensation of isobutylene and formaldehyde over a boron phosphate on silica gel catalyst in the vapor phase, essentially as described in U.S. Pat. No. 2,997,509, is carried out by gradually increasing the reaction temperature with time thereby compensating for the decrease in catalyst activity and thus permitting operation for longer periods of time between catalyst regenerations with essentially no loss in isoprene production rate during such operation.

It is an object of this invention therefore to provide a method for the catalytic synthesis of isoprene wherein the length of time between catalyst regenerations is increased without loss in isoprene production rate.

It is another object of this invention to provide a method for the catalytic synthesis of isoprene wherein the reaction temperature is increased at such a rate that it compensates for loss in catalyst activity with use thereby avoiding loss in the isoprene production rate.

Other objects of this invention will be apparent from the following description of the preferred embodiments and from the claims.

DESCRIPTION OF THE PREFERRED EMBODIMENTS

The reaction may be carried out at a temperature in the range of from about 150° C. to 400° C. but it is greatly preferred to use temperatures in the range of from 250° C. to 350° C. The space velocity of the reactants over the catalyst can range between 0.1 and 50 moles of formaldehyde per liter of catalyst per hour, however, a range of from about 0.5 to 4.0 moles of formaldehyde per liter of catalyst per hour is preferred, with from 1 to 3 moles per liter per hour being the most preferred. The mole ratio of isobutylene to formaldehyde can range from about 2:1 to 12:1 or higher, however, the most preferred ratio is about 8:1. The formaldehyde is generally employed in the form of its commercially aqueous solution stabilized with methanol. Such solutions, in general, contain about 37 weight percent formaldehyde, from 10 to 15 weight percent methanol and the remainder water.

The catalyst employed is preferably that described in Example 1 in the aforementioned U.S. Pat. No. 2,997,509, consisting of silica gel coated with a pre-formed boron phosphate powder. The silica gel employed in making the catalysts for use in the examples given herein, was a commercial grade of 3–8 mesh with a surface area of 268 square meters per gram. Ten parts per weight of this granular siilca gel were stirred with a suspension of 1 part by weight of crystalline boron phosphate powder in 20 parts by weight of water and the mixture heated for 90 minutes at 550° C. The catalyst was preferred to that consisting of a mixed phosphoric acid-boric acid-silica gel catalyst, described in Example 2 of the aforementioned patent, since the pre-formed boron phosphate-silica gel catalyst had a more uniform coating and gave somewhat better results.

The reaction is carried out by passing the vaporized reactants, i.e. formaldehyde, methanol, steam and isobutylene, over the catalyst at reaction temperature, and at the space velocity to be described, under atmospheric pressure, such pressure being preferred. The reaction products are condensed and fractionally distilled to recover the isoprene.

The following examples are provided to illustrate the process of this invention.

EXAMPLE I

A series of three 4 hour runs were made on the preformed boron phosphate-silica gel catalyst at successive temperatures of 250° C., 275° C., and 300° C., with a 8:1 mole ratio of isobutylene to formaldehyde and at a feed rate of 1 mole of formaldehyde per liter of catalyst per hour. This corresponded to a total feed rate, i.e. space velocity, of about 12 moles of total feed per liter of catalysts per hour. The results are shown in Table I. The formaldehyde conversion is in mole percent formaldehyde converted per mole of formaldehyde charged, and the isoprene selectivity is in mole percent of isoprene based on the moles of formaldehyde consumed. On a theoretical basis one more of formaldehyde consumed should produce one mole of isoprene. The isoprene production rate is given in grams per liter of catalyst per hour.

TABLE I

| Temp. (C.°) | Time (hrs.) | HCHO conv. | Isoprene select. | g. Isoprene/ l. catalyst hr. |
|---|---|---|---|---|
| 250 | 4 | 74 | 67 | 33.6 |
| 275 | 4 | 62 | 80 | 33.5 |
| 300 | 4 | 58 | 84 | 33.1 |

These runs show that with a temperature rate of increase of about 6° C. per hour a constant isoprene production rate can be maintained.

EXAMPLE II

A run using the same conditions and same catalyst as in Example I was carried out using a constant reaction temperature of 250° C. After 6½ hours the isoprene production rate had decreased to 50 percent of the initial rate and accordingly the run was terminated.

EXAMPLE III

Another series of runs were carried out like that of Example I except that the reaction temperature was increased at the rate of 5° C. per hour for 20 hours raising the temperature from 250° C. initially to 350° C. when the run was terminated. Substantially no loss in isoprene production rate was found.

It has been found that the rate of temperature increase can range from about 2°–3° C. to 10° C. per hour with from about 5° C. to 7° C. increase per hour being preferred. It has also been found that the temperature can be increased either incrementally as in these examples or in smaller time intervals such as an increase each hour. Commercially this invention would be extremely applicable since automatic controllers could be employed to give a continuous increase in temperature at any predetermined rate or even based on continuous product analyses.

The foregoing examples do not represent optimized condition since higher space velocities give higher amounts of isoprene per volume of catalyst per hour, but also the isoprene selectivity is lowered somewhat. The examples do show, however, that by the method of this invention, i.e. by increasing the reaction temperature to compensate for less in catalyst activity it is possible not only to maintain a substantially constant isoprene production rate, but also lengthen the time between regenerations.

The catalyst can be regenerated by heating in a stream of air at 550° C. for one hour. Following regeneration the catalyst can again be used together with the method of this invention to attain the desired objects.

We claim:
1. In the process for the synthesis of isoprene, wherein isobutylene and formaldehyde are condensed in the vapor phase over a boron phosphate catalyst, the improvement comprising increasing the reaction temeprature at a rate sufficient to compensate for the decrease in catalyst activity thereby maintaining a substantially constant isoprene production rate.

2. The method according to claim 1, wherein said condensation is carried out at a temperature in the range of from 250° C. to 350° C. and the temperature is increased at a rate in the range of from 2° C. to 10° C. per hour.

3. The method according to claim 2, wherein the temperature is increased at a rate in the range of 5° C. to 7° C. per hour.

References Cited
UNITED STATES PATENTS

| | | | |
|---|---|---|---|
| 2,997,509 | 8/1961 | Writh | 260—681 |
| 3,350,474 | 10/1967 | Wirth | 260—681 |

DELBERT E. GANTZ, Primary Examiner

V. O'KEEFE, Assistant Examiner